April 13, 1954     H. R. SUMMERHAYES, JR     2,674,917
NONCONTACTING WIDTH GAUGE
Filed March 6, 1951     2 Sheets-Sheet 1
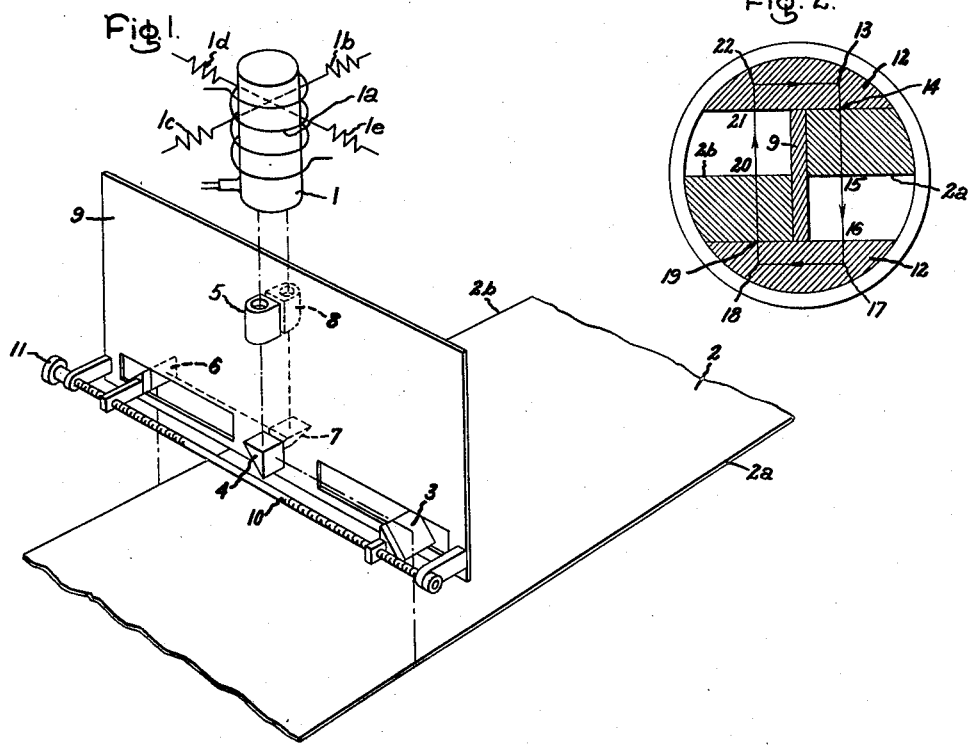
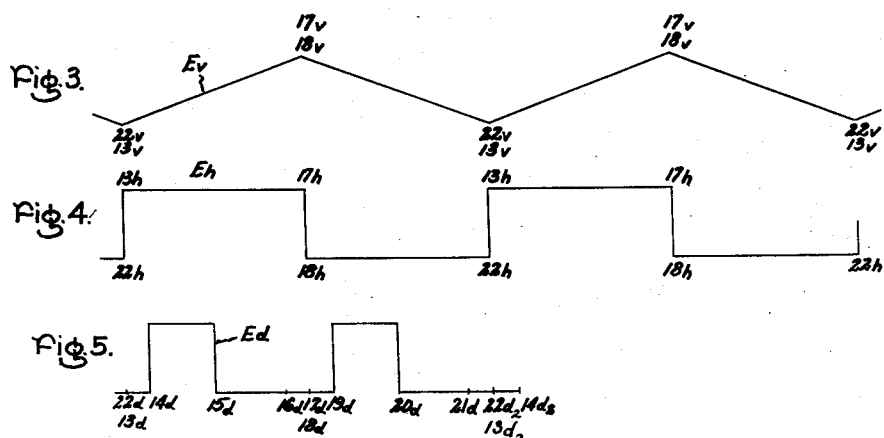
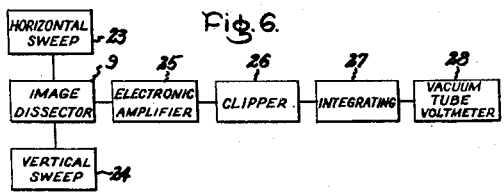
Inventor:
Harry R. Summerhayes,
by Paul A. Frank
His Attorney.

April 13, 1954   H. R. SUMMERHAYES, JR   2,674,917
NONCONTACTING WIDTH GAUGE
Filed March 6, 1951   2 Sheets-Sheet 2
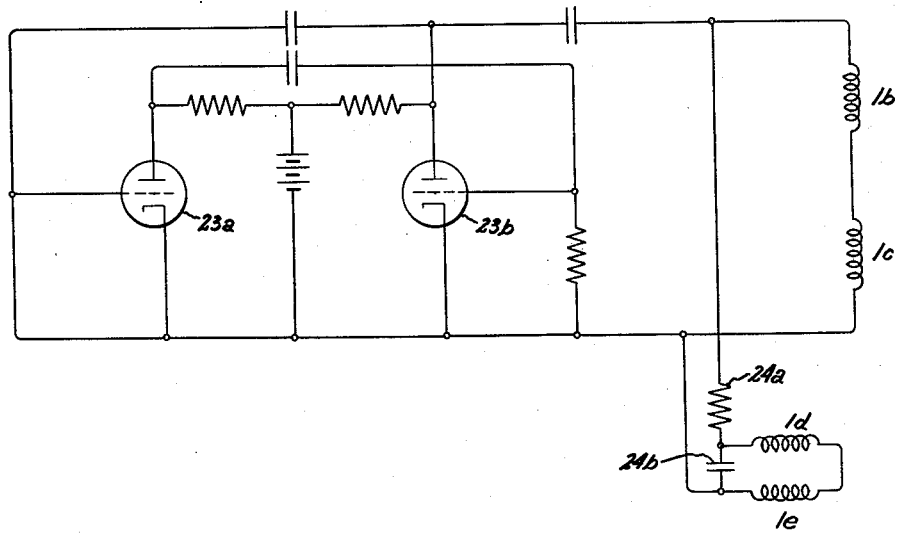
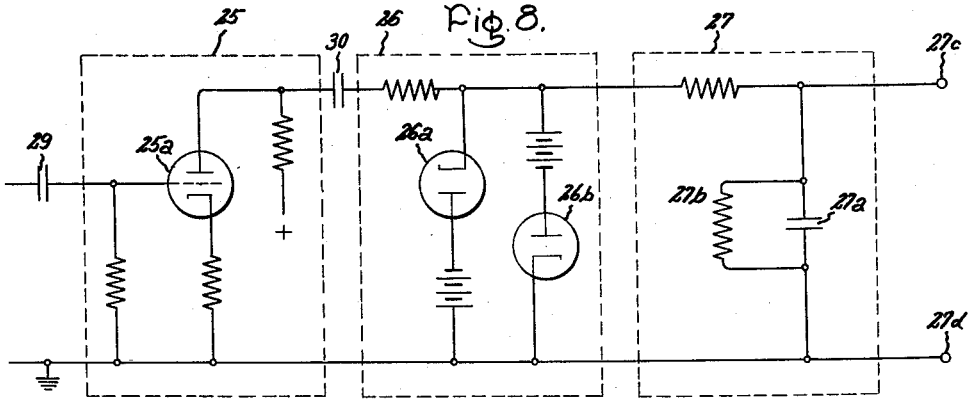
Inventor:
Harry R. Summerhayes,
by Paul A. Frank
His Attorney.

Patented Apr. 13, 1954

2,674,917

UNITED STATES PATENT OFFICE 2,674,917

NONCONTACTING WIDTH GAUGE

Harry R. Summerhayes, Jr., Schenectady, N. Y., assignor to General Electric Company, a corporation of New York Application March 6, 1951, Serial No. 214,079

6 Claims. (Cl. 88—14)

My invention relates to width gauges for use with moving strips of material and more particularly to non-contacting width gauges for such use.

In steel rolling mills it is often desired to measure the width of a strip of steel at various places in the mill. The fact that the steel is moving quite rapidly and may be quite hot at the places where measurement is desired makes a non-contacting gauge a necessity. Moreover, to insure accuracy, any non-contacting gauge must produce readings which are independent of the height of the gauge above the strip of material over the range of height variations caused by normal amounts of vertical motion of the steel strip. Although there do exist conventional width gauges which give reasonably accurate readings, these gauges are quite complex and expensive.

Therefore, an important object of my invention is to provide an improved non-contacting width gauge for indicating the width of a moving strip of material.

Another object of my invention is to provide a relatively simple and inexpensive non-contacting width gauge for indicating the width of a moving strip of material independently of the height of the gauge above the material.

In carrying out my invention in one embodiment thereof, the images of the two longitudinally extending edges of a moving strip of material are directed onto different portions of a television camera pick-up tube through optical systems, consisting of prisms or mirrors, and lenses, which transmit the images along paths which are essentially rectangular with respect to the strip of material. The television camera pick-up tube, as actuated by the images of the edges of the strip of moving material, produces voltage pulses whose durations or widths vary with the width of the strip. The pulses are fed to a circuit which produces an output indicative of the durations of the pulses. This output is supplied to an electrical indicating device, for example, a voltmeter, which by its deflection indicates any variation in the width of the strip of moving material.

For a better and more complete understanding of my invention, together with additional objects and advantages thereof, attention is now directed to the following description and to the accompanying drawing in which:

Fig. 1 is a view in perspective of a preferred embodiment of my invention;

Fig. 2 is a typical schematic diagram of the image seen by the television camera pick-up tube embodied in my invention;

Fig. 3 illustrates the preferred wave form for the sweep voltage applied to the vertical deflection coils of the television camera pick-up tube illustrated in Fig. 1;

Fig. 4 illustrates the preferred wave form for the sweep voltage applied to the horizontal deflection coils of the television camera pick-up tube;

Fig. 5 illustrates a typical wave form for the output pulses of the television camera pick-up tube;

Fig. 6 is a conventional block-and-line diagram of an electrical circuit for use with my invention;

Fig. 7 is a schematic diagram of a circuit for producing the sweep voltages applied to the horizontal and vertical deflection coils of the television camera pick-up tube; and Fig. 8 is a schematic diagram of a circuit corresponding to a portion of the block-and-line diagram of Fig. 6.

Referring to Fig. 1, a television camera pick-up tube, such as image dissector 1, is mounted adjacent a strip 2 of moving material, for example, hot steel. The images of edges 2a and 2b of strip 2 are directed through essentially rectangular paths onto image dissector 1 by means of two similar optical systems. Image dissector 1, as is well known in the art, employs a photosensitive cathode to produce an electron current image of the object being viewed. The electron image is focused by means of a focus coil 1a toward an aperture which collects a portion of the electron image. The various portions or areas of the image are deflected across the aperture by means of horizontal deflection coils 1b and 1c and vertical deflection coils 1d and 1e. An anode, positioned behind the aperture, collects the electrons entering the aperture and through an electron multiplier products an electrical output signal indicative at any instant of the portion of the electron image passing through the aperture. The process of deflecting certain portions of the electron image past the aperture in continuous timed sequence is called "scanning the image." Other types of television camera pick-up tubes which may be used are the orthicon, the image orthicon and the vidicon.

The optical system for directing the image of edge 2a onto image dissector 1 is comprised of a first light diverting means formed by a movable prism 3, a second light diverting means formed by a stationary prism 4 and a focusing lens 5, while the system for directing the image of edge 2b thereon is comprised of a movable prism 6, a stationary prism 7 and a focusing lens 8. Prisms 3, 4, 6 and 7 all reflect an image through an angle of substantially 90 degrees, i. e., substantially a right angle. Prisms 3 and 6 are respectively positioned to receive the images of edges 2a and 2b, and prisms 4 and 7 are respectively positioned to receive the images from prisms 3 and 6. Lenses 5 and 8 receive the respective images from prisms 4 and 7 and focus them on different portions of image dissector 1. Since the prisms all turn the images through right angles, the image paths may be said to be rectangular with respect to strip 2. When strip 2 deviates from the normal width, the image paths are not strictly rectangular but the effect does not produce serious error. If so desired, mirrors or other reflecting means may be used in place of prisms.

To prevent overlapping of the images of the two edges received in image dissector 1, the two optical systems are disposed longitudinally from one another along strip 2 and a partition 9, extending transversely across the strip, is placed between them. Prisms 3 and 6 which view the respective edges of strip 2 are slidably mounted on the lower portion of partition 9, and a calibrated screw mechanism 10 actuated by handwheel 11 is employed to simultaneously adjust the positions of prisms 3 and 6 for strips of different normal widths.

A portion of the face of image dissector 1 is covered by a mask 12, as is shown in Fig. 2. Mask 12 provides reference points in the scanning path employed in image dissector 1, as will be more fully described hereinafter. The optical systems are positioned such that the images of edges 2a and 2b appear opposite each other on image dissector 1 when strip 2 is exactly of the normal width for which screw mechanism 10 is set. If strip 2 moves laterally, the images of the edges 2a and 2b remain opposite each other but move in the same direction along partition 9. When strip 2 becomes wider than the normal width, the image of 2a moves downwardly while the image of edge 2b moves upwardly. When strip 2 becomes narrower than the normal width, the image of edge 2a moves upwardly, while the image of edge 2b moves downwardly. The terms "upwardly" and "downwardly" refer to the directions of motion of the images of the edges of the strip as viewed in Fig. 2.

The electron image produced in image dissector 1 is scanned in a rectangular path, which, if referred to the face of the image dissector 1, would pass through points 13, 14, 15, 16, 17, 18, 19, 20, 21 and 22. The area enclosed by the path is, in effect, substantially divided in half by the image of partition 9.

The scanning is accomplished by applying to vertical deflection coils 1d and 1e of image dissector 1 a voltage ideally having a sawtooth wave shape such as is represented by the sawtooth curve $E_v$ in Fig. 3 and by applying to the horizontal deflection coils 1b and 1c a voltage ideally having a square wave shape such as represented by the square wave $E_h$ in Fig. 4. The scanning path is switched from point 17 to point 18 and from point 22 to point 13 by the horizontal deflection voltage $E_h$ and from point 13 to point 17 and point 18 to point 22 by the vertical deflection voltage $E_v$.

For the case in which the width of strip 2 is equal to the normal width, the output voltage of the image dissector resulting from the scanning of the images of the edges of the strip is represented by the square wave voltage $E_d$ in Fig. 5. The points of these voltage waves corresponding in time to the numbered points of the scanning path are indicated by similar numbers with appropriate subscripts. For example, the corresponding points in the voltage waves $E_v$, $E_h$ and $E_d$ have the subscripts $v$, $h$ and $d$ respectively.

Since the steel strip 2 is red or even white hot when undergoing measurement, it serves as a light source and the immediately surrounding space is relatively dark. In cases of width measurement of materials not sufficiently hot to produce a photoelectric signal in the image dissector, the material may be illuminated.

For purposes of illustration, it will be assumed that the scanning path is scanned in a clockwise direction as indicated by the arrowheads in Fig. 2. From point 22 to point 14 mask 12, which appears as a dark space on the cathode of image dissector 1, is viewed and the portion of the voltage wave $E_d$ between the points 22 and 14d is produced. Between points 14 and 15 of the scanning path, edge 2a and a portion of strip 2 adjacent thereto are scanned and a pulse is produced in the output voltage of image dissector 1, as is represented by the portion of voltage wave $E_d$ between the points 14d and 15d. Point 14 locates the edge of mask 12 while point 15 locates the position of edge 2a. From point 15 to point 16 the space adjacent edge 2a, which appears as a relatively dark area on the cathode of image dissector 1, is viewed and the portion of the output voltage wave $E_d$ between points 15d and 16d is produced. Between points 16, 17, 18 and 19 mask 12 is viewed, again appearing as a dark space, and the portion of voltage wave $E_d$ between points 16d and 19d is generated.

Edge 2b and a portion of strip 2 adjacent thereto are scanned between the points 19 and 20. This portion of strip 2 appears as a lighted area, and the pulse in voltage wave $E_d$ between the points 19d and 20d is produced. Point 19 represents the edge of mask 12 and point 20 represents edge 2b. The space adjacent edge 2b is scanned between the points 20 and 21, and the upper portion of mask 12 is scanned between the points 21, 22, 13 and 14. All the space between points 20 and 14 in the direction of scanning appears as a dark area on the cathode of image dissector 1 and the portion of voltage wave $E_d$ between points 20d and 14d₂ is generated. The subscript 2 in 22d₂, 13d₂ and 14d₂ indicates that these points are in the succeeding traverse of the scanning path.

Thus, as is shown in Fig. 5, two pulses occur in the output voltage wave of the image dissector for each complete traverse of the scanning path, one pulse occurring between points 14 and 15 and the other between points 19 and 20. Points 14 and 19 are associated with the edges of mask 12 and, in effect, always remain stationary in time phase; but the positions of points 15 and 20 are dependent on the position of edges 2a and 2b, respectively. If strip 2 moves from side to side, one of the pulses becomes narrower than shown and one becomes wider, but the total area under both pulses remains the same. If the width of strip 2 increases above the normal width, both pulses become wider, while if the strip narrows, both pulses become narrower.

In Fig. 6 is illustrated in block-and-line form an electrical circuit for producing and for measuring the combined widths of the above-mentioned pulses. A horizontal sweep generator 23 supplies a voltage having substantially the wave form shown in Fig. 4 to the horizontal deflection coils 1b and 1c of image dissector 1 and a vertical sweep generator 24 supplies a voltage wave having substantially the wave form shown in Fig. 3 to the vertical deflection coils 1d and 1e.

In Fig. 7 is shown an example of a simplified circuit for producing voltage waves $E_h$ and $E_v$. The square wave voltage $E_h$ for horizontal deflection coils 1b and 1c is produced by a conventional multivibrator circuit employing two electron discharge devices, such as the vacuum tube triodes 23a and 23b, which are alternately triggered to pass current. For a more detailed explanation of the multivibrator, reference may be had to any standard electronics textbook such as Brainerd, Koehler, Reich and Woodruff, "Ultra-high Frequency Techniques," D. Van Nostrand Co., New York, 1942. Part of the square wave output of the multivibrator circuit is fed to an integrating circuit consisting of a resistor 24a and a capacitor 24b. This integrating circuit, as is well known to the art, when energized with a square wave voltage, supplies a sawtooth voltage such as voltage wave $E_v$ to any load, such as vertical deflection coils 1d and 1e, connected across capacitor 24b.

The voltage output pulses of image dissector 1 are amplified in a conventional electronic amplifier 25 and then passed through a clipping circuit 26 which clips the pulses to a predetermined magnitude. Clipping circuit 26 is necessary since the amplitudes of the output pulses of image dissector 1 vary with the amount of light striking the cathode of image dissector 1, and, hence, upon the temperature of the steel being measured. The output of clipping circuit 26 is supplied to an integrating circuit 27, which produces a D. C. voltage proportional to the average value of the clipped pulses and thus, actually, to the widths of the pulses produced by image dissector 1. The D. C. voltage is applied to a standard D. C. voltage indicating device, such as vacuum tube voltmeter 28. Meter 28 is preferably calibrated to have its reading for the normal width of strip 2 at mid-scale so that departures in either direction from the normal width of the strip may be indicated directly on the meter by deflections to the right or left of the normal position.

In Fig. 8 is shown a conventional electronic circuit, including an amplifier, a clipper, and an integrating circuit, for converting the output pulses of image dissector 1 to a D. C. voltage suitable to be applied to voltmeter 28. The amplifier 25 comprises an electron discharge device, such as vacuum tube triode 25a, and associated resistors, the control electrode of the triode being supplied with the output voltage of image dissector 1 through a coupling capacitor 29. The amplified pulses are fed to clipper 26 through a coupling capacitor 30. Clipper 26 employs two electron discharge devices, such as vacuum tube diodes 26a and 26b, to produce output pulses of constant amplitude from input pulses of varying amplitude. The constant amplitude pulses from clipper 26 are supplied to an integrating circuit 27, through the action of capacitor 27a and a parallel connected leakage resistor 27b, produces at the output terminals 27c and 27d a D. C. voltage indicative of the input pulse width. Circuit 27 must have a long enough time constant to reduce the scanning frequency fluctuation on voltmeter 28 to a value which is not objectionable.

The circuit described above is intended to be merely illustrative. Many different types of circuits could be substituted for each of the component circuits illustrated. Thus, while the present invention has been described by reference to a particular embodiment thereof, it will be understood that this is by way of illustration of the principle involved and that those skilled in the art may make many alterations and modifications in the arrangement and mode of operation. Therefore, I contemplate by the appended claims to cover any such modifications as fall within the true spirit and scope of my invention.

What I claim as new and desire to secure by Letters Patent of the United States is:

1. In a non-contacting width gauge for indicating the width of a moving strip of material a television camera pick-up tube for producing electrical signals in response to the scanning in a predetermined path of the image developed in said tube; a pair of optical systems, one for each longitudinally extending edge of said moving strip for directing the image of a section of each of said edges and a portion of said strip adjacent thereto onto a different portion of said television camera tube, each of said optical systems comprising a movable prism for reflecting an image through substantially a right angle positioned to receive the image of the associated edge of said strip and a portion of said strip adjacent thereto, a stationary prism for reflecting an image through substantially a right angle positioned to receive said image from said movable prism and lens means positioned to receive said image from said stationary prism and to focus said image onto a portion of said television camera pick-up tube; a partition mounted over said strip and extending transversely thereto between said optical systems for separating the images directed onto said television camera pick-up tube by said optical systems, an adjusting mechanism for changing the position of said movable prisms to provide for viewing strips of various normal widths, and electric signal responsive width indicating means operatively coupled to the output of said television camera pick-up tube for providing an indication of the width of the object being gauged.

2. A non-contacting inspection gauge for strip material including in combination electron-optic electric signal generating means for producing first and second series of electric pulses, said first series of pulses having durations which vary with variations in the position of one longitudinally extending edge of the strip of material being gauged and said second series of pulses having durations which vary with variations in the position of the remaining longitudinally extending edge of the strip material, electric signal integrating means coupled to the output of said electron-optic electric signal generating means for combining and integrating said first and second series of electric pulses, and an indicator coupled to the output of said electric signal integrating means for providing an indication of the width of the material being gauged.

3. A non-contacting inspection gauge for strip material including in combination means for producing a first series of periodic electric pulses having durations which vary with variations in the position of one longitudinally extending edge of the strip of material being gauged, means for producing a second series of periodic electric pulses having durations which vary with variations in the position of the remaining longitudinally extending edge of the strip material, electric signal integrating means coupled to the output of said first-mentioned means and said second-mentioned means for combining and integrating the electric signals developed thereby, and an indicator operatively coupled to the output of said integrating means for providing an indication of the width of the material being gauged.

4. In a non-contacting width gauge for indicating the width of a moving strip of material, a television camera pick-up tube for producing electrical signals in response to the scanning in a predetermined path of the image developed in said tube, a pair of optical systems one for each longitudinally extending edge of said moving strip for directing the image of a section of each of said edges and a portion of said strip adjacent thereto onto a different portion of said television camera tube, each of said optical systems comprising first reflecting means for reflecting an image through substantially a right angle positioned to receive the image of the associated edge of said strip and second reflecting means for reflecting an image through substantially a right angle positioned to receive the image reflected from said first reflecting means and to direct the image onto a portion of said television camera pick-up tube, means for separating the images of the two longitudinally extending edges directed onto said television camera pick-up tube by said optical systems, and electric signal responsive width indicating means operatively coupled to the output of said television camera pick-up tube for providing an indication of the width of the object being gauged.

5. A non-contacting inspection gauge for strip material including in combination an electron-optic electric signal generating means for producing first and second series of electric signal pulses, said first series of pulses having durations which vary with variations in the position of one longitudinally extending edge of the strip of material being gauged and said second series of pulses having durations which vary with variations in the positions of the remaining longitudinally extending edge of the strip material, a pair of optical systems each positioned to view only a respective longitudinally extending edge of the moving strip of material and for directing the image of each of said edges onto said electron-optic signal generating means, electric signal integrating means coupled to the output of said electron-optic means for combining and integrating said first and second series of electric signal pulses, and in indicator coupled to the output of said integrating means for providing an indication of the width of the material being gauged.

6. A non-contacting inspection gauge for strip material including in combination an electron-optic electric signal generating means for producing first and second series of electric signal pulses, said first series of pulses having durations which vary with variations in the position of one longitudinally extending edge of the strip of material being gauged and said second series of pulses having durations which vary with variations in the position of the remaining longitudinally extending edge of the strip of material, a pair of optical systems each positioned to view only a respective longitudinally extending edge of the moving strip of material and for directing the image of each of said edges onto said electron-optic signal generating means, electric signal pulse amplitude clipping means operatively coupled to the output of said electron-optics signal generating means, electric signal integrating means coupled to the output of said clipping means for combining and integrating said first and second series of electric signal pulses, and an indicator coupled to the output of said integrating means for providing an indication of the width of the material being gauged.

References Cited in the file of this patent

UNITED STATES PATENTS

| Number | Name | Date |
| --- | --- | --- |
| 2,237,811 | Cockrell | Apr. 8, 1941 |
| 2,455,532 | Sunstein | Dec. 7, 1948 |
| 2,474,906 | Meloon | July 5, 1949 |
| 2,548,590 | Cook | Apr. 10, 1951 |
| 2,621,247 | Wright | Dec. 9, 1952 |

FOREIGN PATENTS

| Number | Country | Date |
| --- | --- | --- |
| 633,509 | Great Britain | Dec. 19, 1949 |